United States Patent [19]

Nafziger

[11] Patent Number: 5,779,749
[45] Date of Patent: Jul. 14, 1998

[54] GENERATION OF NEEDLE MOTION PROFILE IN AN INDIVIDUAL SECTION GLASSWARE FORMING SYSTEM

[75] Inventor: Gregory W. Nafziger, Archbold, Ohio

[73] Assignee: Owens-Brockway Glass Container Inc., Toledo, Ohio

[21] Appl. No.: 844,739

[22] Filed: Apr. 21, 1997

[51] Int. Cl.$^6$ .................................................. G05B 19/19
[52] U.S. Cl. .............................. 65/29.11; 65/158; 65/129; 65/330; 65/331; 364/473.02
[58] Field of Search ............................. 65/29.1, 29.11, 65/158, 129, 328, 330, 331; 364/570, 571.04, 571.08, 473.02

[56] References Cited

U.S. PATENT DOCUMENTS

| | | | |
|---|---|---|---|
| 3,419,373 | 12/1968 | Gould et al. | 65/180 |
| 4,199,344 | 4/1980 | Mumford et al. | 65/260 |
| 4,222,480 | 9/1980 | Perry | 198/468.01 |
| 4,313,750 | 2/1982 | Lulejian et al. | 65/160 |
| 4,364,764 | 12/1982 | Farkas et al. | 65/29.1 |
| 4,409,013 | 10/1983 | Cardenas et al. | 65/163 |
| 4,427,431 | 1/1984 | Mumford et al. | 65/163 |
| 4,486,843 | 12/1984 | Spongh et al. | 395/92 |
| 4,548,637 | 10/1985 | Miller | 65/163 |
| 4,551,163 | 11/1985 | Duga et al. | 65/129 |
| 4,762,544 | 8/1988 | Davey | 198/468.01 |
| 5,037,466 | 8/1991 | Voisine et al. | 65/260 |
| 5,160,015 | 11/1992 | Perry et al. | 198/468.01 |
| 5,445,662 | 8/1995 | Peterson et al. | 65/158 |

*Primary Examiner*—Peter Chin
*Assistant Examiner*—Sean Vincent

[57] ABSTRACT

In an individual section glassware forming system that includes a plurality of operating mechanisms for performing cyclic motions, an electronic controller for controlling cyclic motion at a needle mechanism includes electronic memory for storing a plurality of motion profiles for the needle mechanism, with each of the profiles comprising a set of needle position data versus time data. Any one of the profiles so stored may be selectively displayed as a graph of position versus time. A plurality of control points, consisting of less than all data points, are highlighted on the graphic display at spaced positions along the graph. An operator may identify one of the control points and change the position data and/or time data associated with that control point. An electronic control computer is responsive to such control point change for automatically recomputing the position data and time data for the profile so as to accommodate the operator-selected changes at the control point. The recomputed position and time data is graphically displayed, including the plurality of control points at spaced positions along the recomputed graph. Most preferably, the recomputed graphic data is superimposed on the graph of the initial position versus time data so that the operator can observe the effects of changes in graphic position of the control data points.

13 Claims, 4 Drawing Sheets

GENERATION OF NEEDLE MOTION PROFILE IN AN INDIVIDUAL SECTION GLASSWARE FORMING SYSTEM

The present invention is directed to individual section (IS) machine glassware forming systems, and more particularly to a method and apparatus for generating and modifying the motion profile of the plunger needle(s) in such a system.

BACKGROUND AND OBJECTS OF THE INVENTION

The art of glass container manufacture is currently dominated by the so-called individual section or IS machine. Such machines include a plurality of separate or individual manufacturing sections, each of which has a multiplicity of operating mechanisms for converting one or more charges or gobs of molten glass into hollow glass containers and transferring the containers through successive stages of the machine section. In general, an IS machine system includes a glass source with a needle mechanism for controlling a stream of molten glass, a sheer mechanism for cutting the molten glass into individual gobs, and a gob distributor for distributing the individual gobs among the individual machine sections. Each machine section includes one or more parison molds in which a glass gob is initially formed in a blowing or pressing operation, one or more invert arms for transferring the parisons to blow molds in which the containers are blown to final form, tongs for removing the formed containers onto a deadplate, and a sweepout mechanism for transferring molded containers from the deadplate to a cross-conveyor. The conveyor receives containers from all sections of an IS machine, and conveys the containers to a loader for transfer to an annealing lehr. Operating mechanisms in each section also provide for closure of mold halves, movement of baffles and blowing nozzles, control of cooling wind, etc. U.S. Pat. No. 4,362,544 includes a background discussion of the art of both "blow and blow" and "press and blow" glassware forming processes, and also discusses an electropneumatic individual section machine adapted for use in either process.

The various operating mechanisms of the IS machine system were initially operated and synchronized with each other by means of a machine shaft, a multiplicity of individual cams rotatably carried by the shaft, and pneumatic valves responsive to the cams for selectively feeding air under pressure to the various operating mechanisms. The current trend in the art is toward replacement of the shaft, mechanical cams and pneumatic actuators with electric actuators respsonsive to drivers operated by so-called "electronic cams." These electronic cams take the form of motion profile information for the various operating mechanisms stored in electronic memory and selectively retrieved by electronic control circuitry for operating the electric actuators. Thus, such motions as forming and severing of the glass gobs, moving of the parisons and containers, opening and closing of the blow molds, in and out motions of the funnels, baffles and blow heads, and motions of the sweep-out and lehr-loading devices are accomplished electronically from motion profile information digitally stored in electronic memory, with motions at the various machine sections being synchronized with each other by common clock and reset signals. See U.S. Pat. No. 4,762,544.

In IS machine glassware forming systems that employ mechanical actuating cams on a machine shaft, adjustment of timing and motion profiles of the various operating mechanisms required adjustment or replacement of individual cams. In systems that employ electronic cams, it is often still necessary to stop the machine or machine section, change the motion profile electronically, and then restart the machine. It is a general object of the present invention to provide an apparatus and method for selectively modifying the motion profile of an operating mechanism in such a glassware forming system that may be easily implemented in a manufacturing environment with a minimum of operator training. A more specific object of the present invention is to provide a method and system for generating motion control profiles, particularly for controlling motion at the molten glass discharge needle, in which profile data can be readily changed, in which profile modifications are made off-line while the system is operating, which are user friendly, and which can be readily employed for creating a library of motion control profiles that may be later selected for use by an operator.

SUMMARY OF THE INVENTION

In an individual section glassware forming system that includes a plurality of operating mechanisms for performing cyclic motions, an electronic control arrangement for controlling cyclic motion of at least one of the operating mechanisms in accordance with the present invention includes electronic memory for storing a plurality of motion profiles for the one mechanism, with each of the profiles comprising a set or table of position data versus time data. Any one of the profiles so stored may be selectively displayed on an operator screen as a graph of position versus time. A plurality of control points, consisting of less than all data points, are identifiable on the graphic operator display at spaced positions along the profile graph. The operator may select one of the control points, and may change the position data and/or time data associated with that control point. An electronic control computer is responsive to each control point change for automatically recomputing the position data and time data for the profile so as to accommodate the operator-selected changes at the selected control point. The recomputed position and time data is graphically displayed, including the plurality of control points at spaced positions along the recomputed graph. Most preferably, the recomputed graphic data is superimposed on the graph of the initial position versus time data so that the operator can observe the effects of changes in graphic position of the control data points.

In the preferred embodiment of the invention, the graphic display and operator control facility are implemented in a Windows-based graphic user interface, which can be readily learned by an operator. A pointer on the display screen may be moved by the operator for identifying a graphic control point to be modified, and for modifying graphic position of that control point by "dragging" the control point to a desired new position on the display. Alternatively, the graphic positions of the various control points may be displayed in a table, within which data may be selectively altered by the operator. The recomputed position versus time data preferably is compared to preset operating limits coordinated with operating characteristics of the mechanism in question, and the operator is advised when a data entry beyond the mechanism capabilities has been attempted.

A method for controlling motion of a plunger needle in a molten glass reservoir for controlling glass to form individual gobs for feeding an individual section glassware forming system in accordance with the present invention comprises the steps of storing in memory at least one motion profile for the needle, consisting of a set or table of position data versus time data, and selectively displaying the motion profile on an operator display screen as a graph of position versus time, preferably in units of needle operating degrees. A plurality of control points, consisting of less than all of the position data versus time data points in the graphic display, are identifiable (as by highlighting) on the display screen at spaced positions along the profile graph. The control data points are selectively movable under control of an operator to new positions on the display screen, and the position data versus time data is automatically recomputed as a function of position and time data associated with the new positions of the control points on the display screen. The new recomputed graphic data is displayed on the screen, preferably superimposed on the original graphic display for continuous comparison by the operator.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
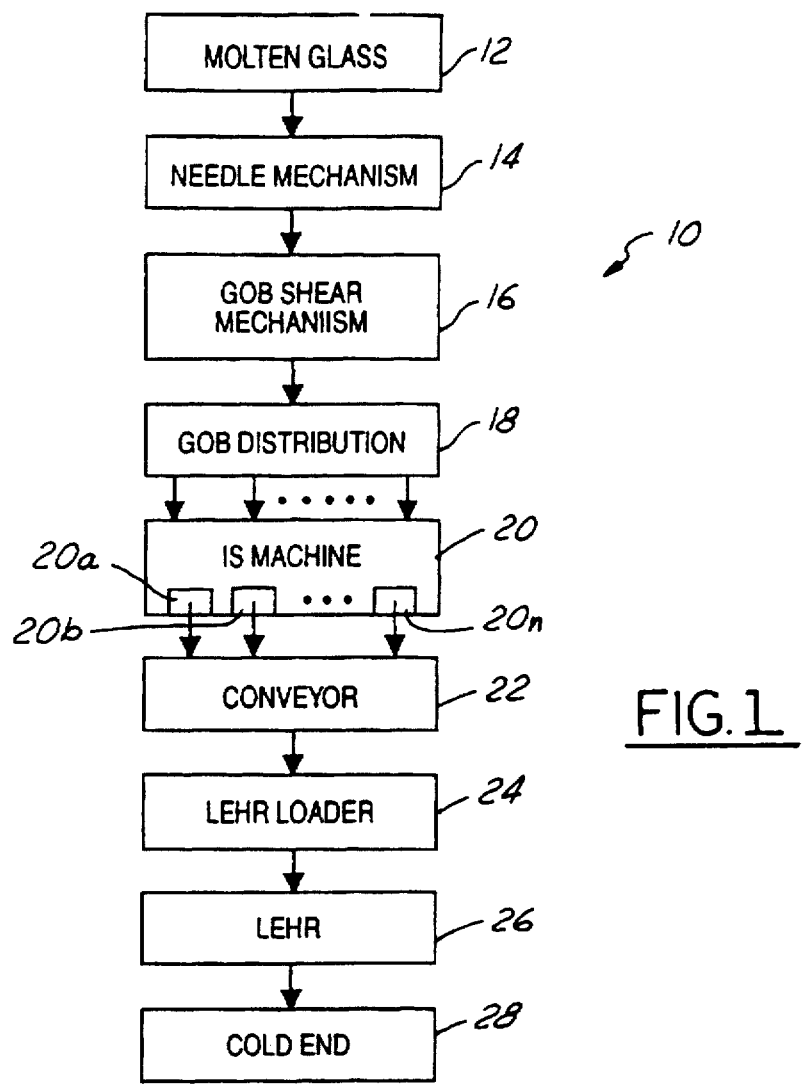
FIG. 1 is a functional block diagram of an individual section (IS) glassware forming system in which the present invention preferably is implemented.

FIG. 1 illustrates an IS machine glassware forming system 10 as comprising a reservoir or bowl 12 containing molten glass (from a forehearth) that is controlled by a needle mechanism 14 to a shear mechanism 16. Shear mechanism 16 severs individual gobs of molten glass, which are fed by a gob distributor 18 to an IS machine 20. IS machine 20 includes a plurality of individual sections within which the gobs are formed into individual pieces of glassware. Each section terminates in a sweepout station 20a, 20b ... 20n, from which the articles of glassware are delivered to a common cross-conveyor 22. Conveyor 22, usually an endless belt conveyor, delivers the containers in sequence to a lehr loader 24, which loads the containers in batches into an annealing lehr 26. The containers are delivered by lehr 26 to the so called cold end 28 of the manufacturing cycle, at which the containers are inspected for commercial variations, sorted, labeled, packaged and/or stored for further processing.

System 10 illustrated in FIG. 1 includes a multiplicity of operating mechanisms for performing operations on the glass, moving glass workpieces through sequential steps of operation, and otherwise performing functions in the system. Such operating mechanisms include, for example, needle mechanism 14, gob shear mechanism 16, gob distributor 18, sweepout mechanisms 20a–20n and lehr loader 24. In addition, there are a multiplicity of operating mechanisms within each section of IS machine 20, such as mechanisms for opening and closing the molds, mechanisms for in and out motions of the funnels, baffles and blow heads, and mechanisms for motions of the invert arms and take-out tongs.

To the extent thus far described, IS machine glassware forming system 10 is of conventional construction. Reservoir 12 and needle mechanism 14 may be as shown, for example, in U.S. Pat. No. 3,419,373. Gob shear mechanism 16 may be as in U.S. Pat. No. 3,758,286 or 4,499,806, or more preferably as in U.S. application Ser. No. 08/322,121 filed Oct. 13, 1994. Gob distributor 18 may be as in U.S. Pat. No. 4,529,431 or 5,405,424. U.S. Pat. Nos. 4,362,544 and 4,427,431 illustrate typical IS machines 20, and U.S. Pat. Nos. 4,199,344, 4,222,480 and 5,160,015 illustrate typical sweepout stations 20a–20n. U.S. Pat. Nos. 4,193,784, 4,290, 517, 4,793,465 and 4,923,363 illustrate suitable lehr loaders 24. U.S. Pat. Nos. 4,141,711, 4,145,204, 4,338,116, 4,364, 764, 4,459,146 and 4,762,544 illustrate various arrangements for electronic control of glassware manufacture in an IS machine system. A system for controlling motions of IS machine operating mechanisms is illustrated, for example, in U.S. Pat. No. 4,548,637. The disclosures of all U.S. patents and applications noted above are incorporated herein by reference for purposes of background.

Figure 2:
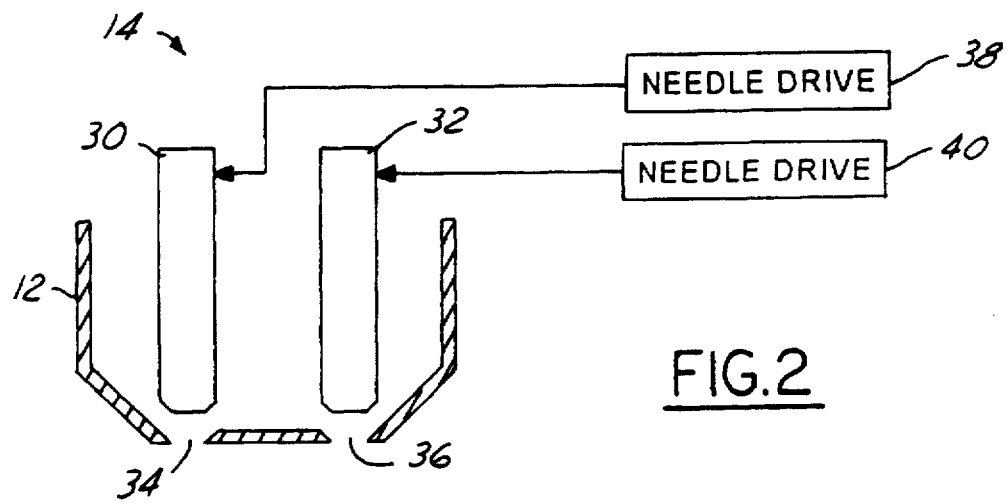
FIG. 2 is a schematic diagram of the reservoir and needle mechanism for delivering a stream of molten glass to the gob shear mechanism in the IS machine system of FIG. 1.

FIG. 2 illustrates needle mechanism 14 as comprising a pair of needles 30, 32 disposed in axial alignment with a corresponding pair of openings 34, 36 in molten glass reservoir 12. Each needle 30, 32 is coupled to an associated electronic operating mechanism 38, 40, by means of which needle 30, 32 are moved axially away from and toward openings 34, 36 along a prescribed motion profile for controlling masses of molten glass to the underlying gob shear mechanism 16 (FIG. 1). In a currently preferred embodiment of the present invention, needle mechanism 14, including needle drives 38, 40, is as disclosed in U.S. application Ser. No. 08/597,760 assigned to the assignee hereof.

Figure 3:
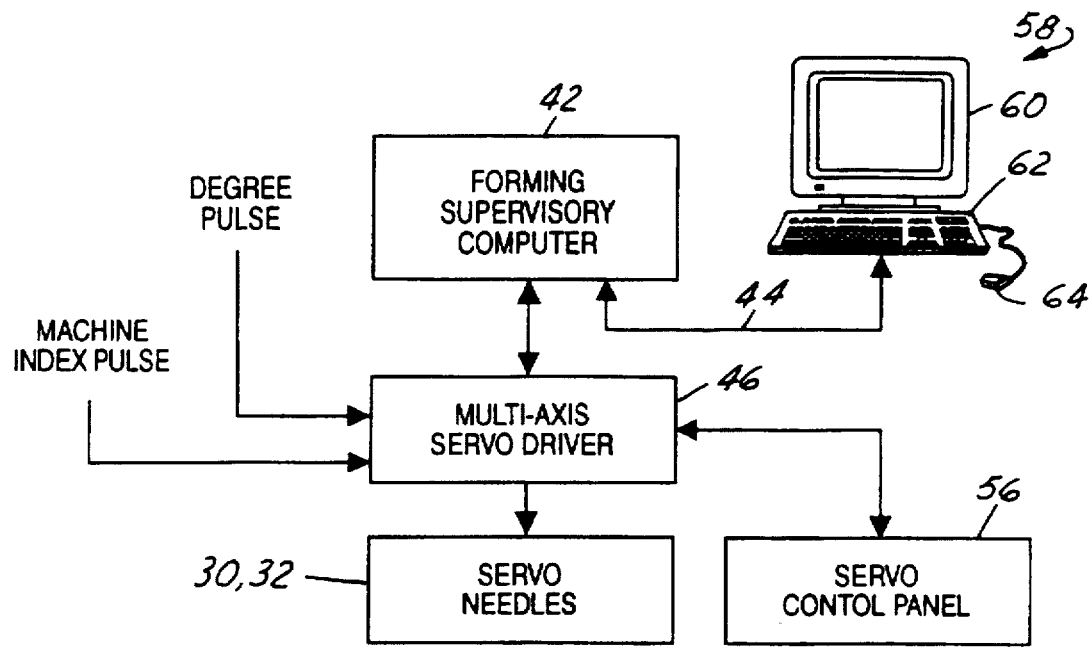
FIG. 3 is a functional block diagram of an electronic control arrangement for operating the needle mechanism in FIGS. 1 and 2.

FIG. 3 illustrates a portion of the IS machine operating system (see above-referenced U.S. Pat. No. 4,548,37) devoted specifically to operation of needles 30, 32. A forming supervisory computer 42 is connected by an ethernet system 44 to a multi-axis servo driver 46. Servo driver 46 also receives machine index pulses and degree pulses for synchronizing operation of all controlled mechanisms to operation of the overall forming system. Servo driver 46 contains microprocessor-based circuitry and memory for receiving and storing profile and other control information from ethernet 44, and for controlling operation at multiple mechanisms, indicating servo needles 30, 32. An operator console 58 includes a computer 62, with a display screen 60 and display control device such as a mouse 64, connected to computer 42 and driver 46 by ethernet system 44. Operator console 58 may comprise, for example, an IBM-compatible personal computer. Among other functions, console 58 provides facility for selectively changing operating mechanism control profiles at driver 46, as will be described. Driver 46 is also directly connected to an operator servo control panel 56, by means of which the operator can select the control profiles to be used for each operating mechanism, and select the starting point and total stroke for each profile. That is, the shape or contour of each profile is selected at console 58, while the scale of each profile is controlled at panel 56.

Figure 4A:
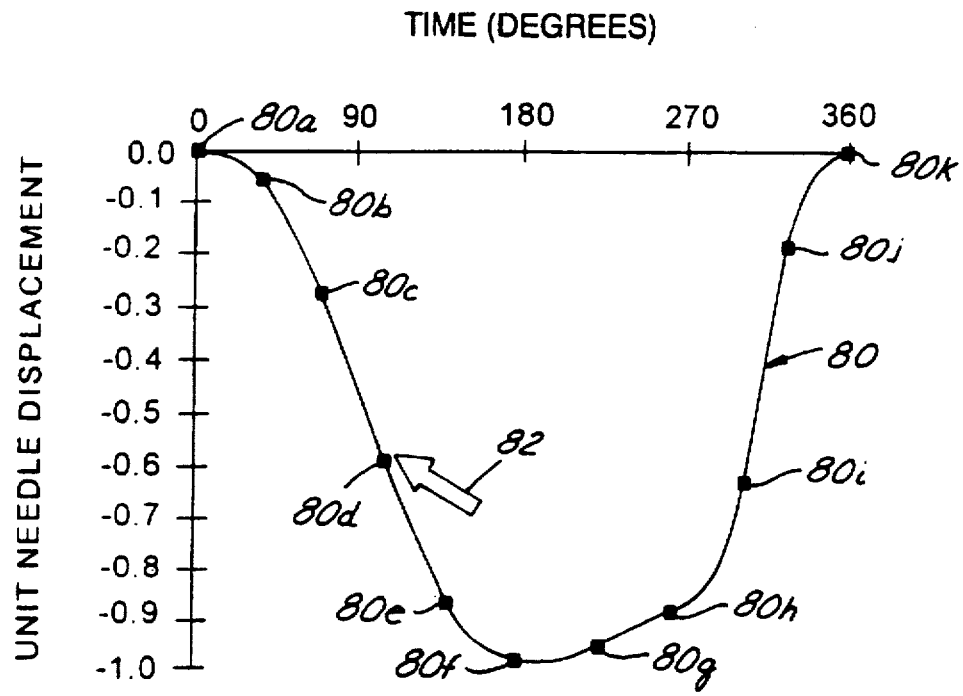
FIGS. 4A,4B and 4C are graphic illustrations useful in explaining operation of the present invention.

The motion control profiles for the servo needle mechanism (as well as the other operating mechanism) are preferably provided as a library of profiles prestored in memory in console 58. The library of prestored profiles may be selectively modified by the operator through operator console 58. Console 58 is preprogrammed to generate motion profiles for the servo needle mechanisms, and to allow the operator to design and modify needle profiles so that needle motion can be optimized for improved gob formation in shearing. FIG. 4A illustrates a typical normalized needle motion profile 80 as a graph of needle displacement versus time. The time increments preferably are in units of operating degrees, that is degrees of motion for the operating mechanism in question as compared with a complete 360° cycle of the entire IS machine system. Since the needles cycle once per machine section during each system cycle (e.g., ten times per machine cycle for a ten-section machine), the operating degrees for the needle mechanisms are closely related to section degrees. The time increments could alternatively be in units of real time, although this is not preferred since constructing the profiles in units of operating degrees renders the profile independent of machine speed. Needle displacement in FIG. 4A is normalized so as to have an amplitude between zero, corresponding to the needle start position, and minus 1.0, corresponding to maximum displacement toward the reservoir opening. Actual starting position, stroke and minimum distance from the reservoir opening, termed offset in the art, are determined by and downloaded from servo control panel 56 (FIG. 3). Thus, the vertical axis or ordinate in FIG. 4A represents needle displacement scaled to unity. The horizonal axis or abscissa is in units of operating degrees, from zero to 360°, which is zero degrees for the next cycle. It will be appreciated, of course, that cycle profile 80 illustrated in FIG. 1 repeats every section cycle.

Figure 4B:
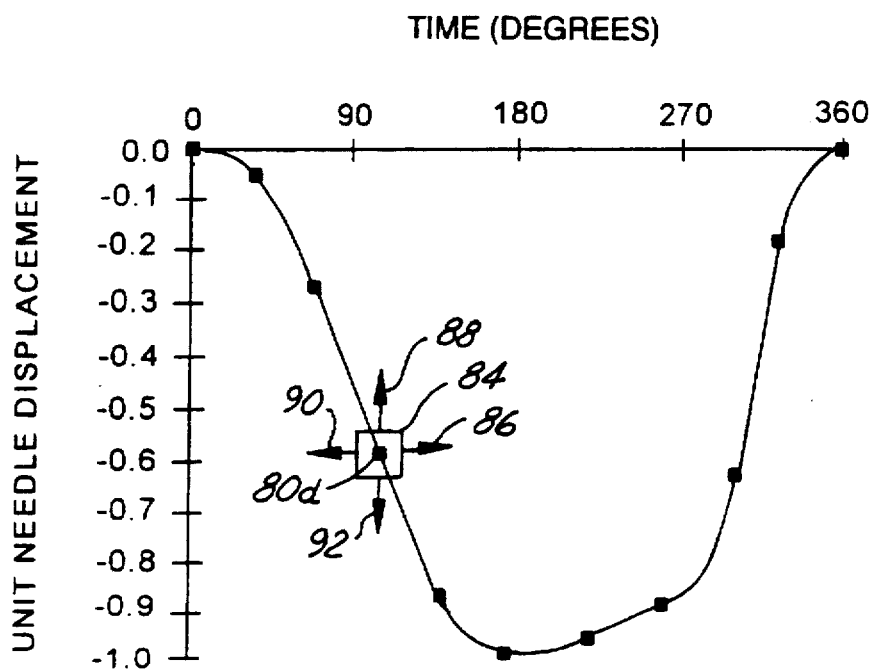
Figure 4C:
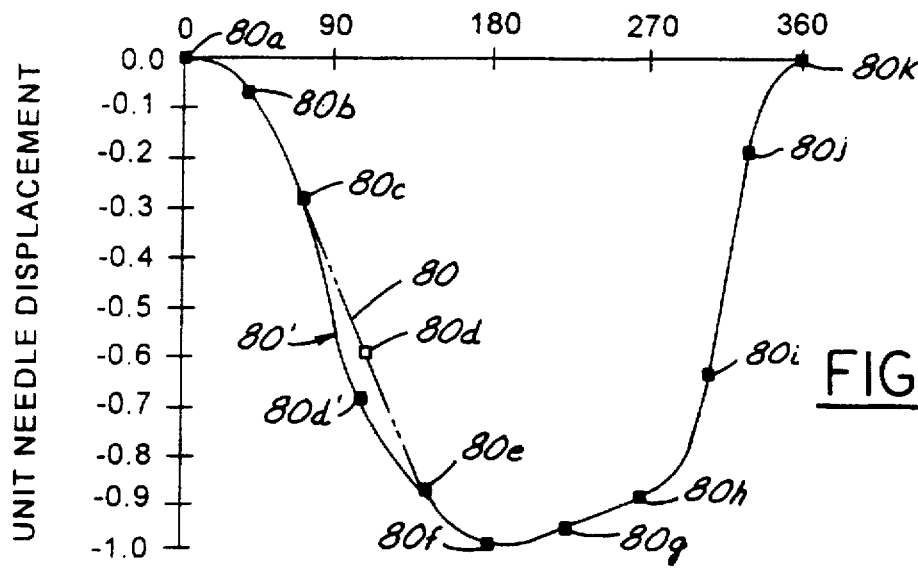

Profile 80 is initially stored in memory as a data set consisting of a multiplicity of position versus time data elements or points. For example, a profile data block may comprise 1024 data points in fractional degree increments. For purposes of editing or modifying the profile, the profile is defined in the graphic display as including a number of control points 80a, 80b, 80c ... 80k. These control points are identifiable on the display screen, and control the shape of profile curve 80. In the currently preferred embodiment of the invention, the control points are highlighted on the screen display by being enlarged and square, as shown in FIG. 4A, and by being displayed in a color different from the rest of the graph. The control points may be moved by mouse 64 (FIG. 3) or can be edited numerically as in FIG. 5, as will be described. The number of control points 80a–80k used for a profile should be kept to a minimum, preferably between seven and fifteen for needle profile definition. To edit profile 80, the screen pointer icon 82 is positioned at a control point, such as control point 80d, and the mouse button is pushed or "clicked". The selected control point is then emphasized on the screen, such as being enclosed within a square 84 in FIG. 4B from which directional arrows 86, 88, 90 and 92 graphically project. The mouse is then used to "drag" selected control point 80d to a new desired location, such as location 80d' in FIG. 4C. Preferably, the coordinates of the selected control point are continuously displayed on the screen to assist in positioning of the control point. When the mouse button is released, the entire profile will be recalculated within computer 44 using the new control point position 80d', and the new profile 80' is displayed. However, initial profile 80 also remains displayed, as illustrated in FIG. 4C (preferably in a different color), with the new recalculated profile superimposed thereon. In this way, the operator can visually determine the effect of profile editing. If the new position of control 80d causes the profile to exceed the horizontal axis, for example, a message window is displayed and the profile control point is returned to its former position.

All of the control points 80a–80k can be repositioned both horizontally and vertically, with the exception of the first two control points 80a, 80b and the last two control points 80j, 80k. The first and last control points are fixed at zero and 360° and 0.0 displacement. The second control point from each end—i.e., control points 80b and 80j—can be repositioned horizontally, but the corresponding stroke displacement is calculated automatically by the program. The profile automatically scales to a unit displacement after each move of a control point. If moving a control point changes the total height of the profile, it will appear as though the vertical placement of the control point changed from the desired position when the graph is recalculated. However, the new position of the control point will be maintained in relationship to the other control points. As noted above, reference profile 80 is always displayed on the screen. The reference profile prestored in computer memory cannot be edited. The reference profile can be updated to match the current profile that is being edited, or the current profile can be changed back to a previously saved profile through menu commands.

Figure 5:
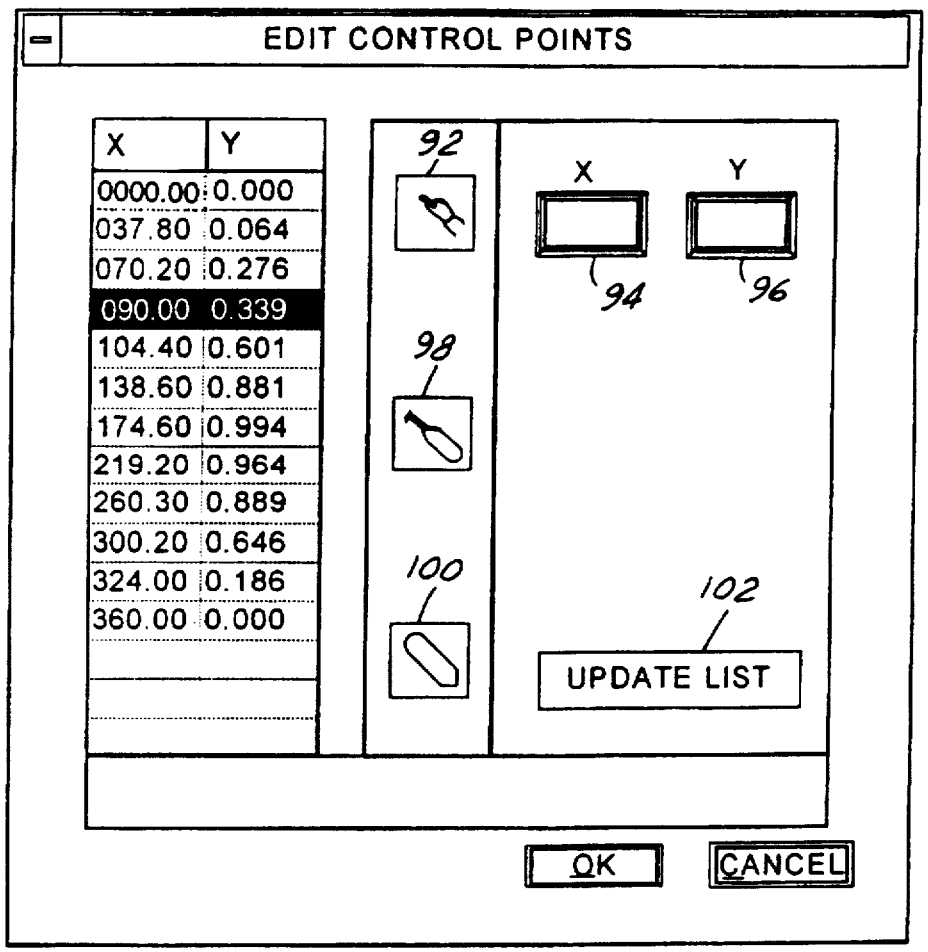
FIG. 5 is a Windows-type tabular display useful in explaining operation of the invention.

A profile may also be edited by editing the control points numerically. FIG. 5 illustrates this option, in which the control points of reference profile 80 in FIG. 4A are tabulated along the X (time) and Y (unit displacement) axes. A control point may be selected by an arrow icon 82 (FIG. 4A). The top icon 92 allows editing the highlighted control point, with edited values appearing in the X and Y windows 94, 96. The middle icon 98 adds a control point if desired, and the bottom icon 100 deletes the highlighted control point. The UPDATE LIST window 102 is used to update the list when editing or adding a control point.

Figure 6:
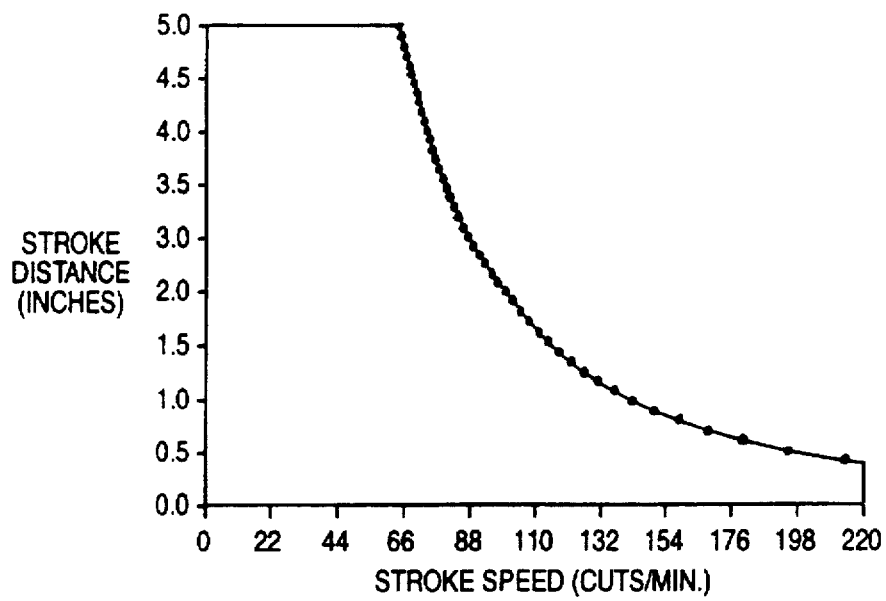
FIG. 6 is a graphic display of needle stroke distance versus machine speed that is useful in discussing operation of the invention.

After making changes to a profile, it is necessary to check the limits of operation for that profile. The operating limits of a profile are constrained by the amount of torque at the drive mechanism that is required to follow the profile. The torque required from the needle actuator depends on two operating conditions, the speed of the mechanism and the stroke. Therefore, the maximum operating conditions for a profile are displayed as in FIG. 6 as a speed/distance reference graph, with the maximum allowable stroke in inches on the vertical axis and the feeder speed in cuts per minute on the horizontal axis. The speed/distance reference graph of FIG. 6 is displayed to the operator by selecting the validate option. FIG. 6 illustrates a speed/distance reference graph for a relatively slow profile. The user can select any node in the graph to get an accurate reading of the maximum stroke and machine speed at that point. Alternatively, the user can scroll through the machine speeds to display the maximum stroke in tabular form for each machine speed. In either case, the selected control point preferably is highlighted in a color different from the rest of the display. The machine speed values at each control point are transferred to the servo system with the profile so that the operator cannot overload the needle mechanism. Although less commonly used, velocity and acceleration graphs preferably are also available to an operator for profile validation purposes. These graphs display actual velocity and acceleration of the needle on the vertical axis, and actual time in milliseconds to complete the stroke on the horizonal axis.

In the preferred implementation of the invention, there are three different classes of profile files in console 58: library files, read-only files and user files. Library files are installed with the computer software, and preferably are indicated or identified by names that correspond to the names of conventional needle cams that produce the same profile. A library profile preferably cannot be deleted or overwritten by other profiles. Read-only profiles are created whenever a profile is used in a set. At the time that the profile set is created, the profiles in the set are made read-only to prevent altering or deleting a profile that may be in use or may be stored in a job history file. As with library files, read-only files cannot be overwritten by other profiles. User profiles can be edited, saved and deleted.

When the software is initially installed, two different directories are set up for storing profiles on the hard drive of console 58. One directory contains all of the library profiles, and the other directory is a user directory where user profiles can be stored. Other directories may be created by the operator. Profile names are stored in the profile file. All new profiles are created by opening an existing profile and saving modifications to a new file. A profile set is used to transfer a number of profiles from console 58 to needle motion controller 46. A set file contains the names of all of the profiles in the set and the profile set name. Most preferably, a profile set can also be retrieved from a floppy disk or other storage device. As noted above, the profile generation program most preferably is a Windows (trademark of Microsoft, Inc.) based program that is easy to learn and use. Passwords may be employed to screen operator access. Various menus and other commands may be employed for various functions as deemed appropriate.

I claim:

1. In an individual section glassware forming system that includes a plurality of operating mechanisms for performing cyclic motions, electronic control means for controlling cyclic motion of at least one of said mechanisms that comprises:

means for storing a plurality of motion profiles for said one mechanism, with each of said profiles comprising a set of position data versus time data, means for selectively displaying one of said profiles as a graph of position versus time, means for identifying on said display a plurality of control points at spaced positions along said graph, means for permitting an operator to select one of said control points, and to change at least one of the position data and time data associated with the control point so selected, means for automatically recomputing said position data versus time data for said profile as a function of data changes at said one control point, and means for displaying the recomputed position data versus time data as a recomputed graph of position versus time, including said plurality of control points at spaced positions along said recomputed graph.

2. The system set forth in claim 1 wherein said means for permitting an operator to select one of said control points comprises means on said display for selectively pointing to individual control points, and operator input means for selectively moving said pointing means about said display.

3. The system set forth in claim 1 wherein said means for permitting an operator to select one of said control points comprises means for displaying said control points as a table of position data versus time data, and means for selectively altering tabulated data so displayed.

4. The system set forth in claim 1 further comprising means responsive to a change of either position data or time data at a said control point for comparing the changed data to preselected standard data to determine if an error has been made, and for displaying an error message to an operator.

5. The system set forth in claim 4 further comprising means responsive to said comparing means to inhibit recomputing of said position data versus time data when an error has been made.

6. The system set forth in claim 1 further comprising means for continuing to display said one profile, following recomputing of said data and graphic display of said recomputed data, as an initial profile on which said recomputed profile data is superimposed.

7. The system set forth in claim 1 further comprising means for selecting the number of control points on said display.

8. The system set forth in claim 1 further comprising means for selectively storing said recomputed profile data, and means for selectively operating said mechanism as a function of said recomputed profile data.

9. The system set forth in claim 8 wherein said one mechanism comprises a needle in a molten glass reservoir.

10. The system set forth in claim 9 wherein said profiles comprise sets of position data in terms of needle displacement versus time data in terms of operating degrees of the needle.

11. A method of controlling motion of a plunger needle in a molten glass reservoir for controlling flow of glass from said reservoir to form individual gobs for feeding to an individual section glassware forming system, said method comprising the steps of:

(a) storing in memory at least one motion profile for said needle, with said profile comprising a set of position data versus time data, (b) selectively displaying said one motion profile on a display screen as a graph of position versus time, (c) identifying on said screen a plurality of control points at spaced positions along said graph and consisting of less than all of said position data versus time data, (d) under control of an operator, moving one of said control points to a new position in said screen, (e) automatically recomputing said position data versus said time data as a function of position and time data associated with said new position of said one control point, and (f) graphically displaying on said display screen the position data versus time data recomputed in said step (e).

12. The method set forth in claim 11 comprising the additional steps of:

(g) repeating said steps (d), (e) and (f) for other control points on said display screen to create a new molten profile for said needle comprising a set of new position data versus time data, and (h) storing said new motion profile in memory.

13. The method set forth in claim 12 comprising the additional step of:

(i) continuing to display said one motion profile on said screen as a graphic display onto which said new motion profile is superimposed.

* * * * *